US009199390B2

(12) United States Patent
Wang

(10) Patent No.: US 9,199,390 B2
(45) Date of Patent: *Dec. 1, 2015

(54) PUSH BLOCK FOR A WOODWORKING APPARATUS

(71) Applicant: MICRO JIG, INC., Winter Springs, FL (US)

(72) Inventor: Henry Wang, Winter Springs, FL (US)

(73) Assignee: MICRO JIG, INC., Winter Springs, FL (US)

( * ) Notice: Subject to any disclaimer, the term of this patent is extended or adjusted under 35 U.S.C. 154(b) by 359 days.

This patent is subject to a terminal disclaimer.

(21) Appl. No.: 13/836,024

(22) Filed: Mar. 15, 2013

(65) Prior Publication Data

US 2014/0260865 A1 Sep. 18, 2014

(51) Int. Cl.
*B23D 15/00* (2006.01)
*B27B 25/10* (2006.01)

(52) U.S. Cl.
CPC ............. *B27B 25/10* (2013.01); *Y10T 83/6638* (2015.04)

(58) Field of Classification Search
CPC ....................................................... B27B 25/10
USPC ........... 83/437.2, 438, 435.15, 442, 441, 445, 83/446, 425, 436.2; 144/245.6
See application file for complete search history.

(56) References Cited

U.S. PATENT DOCUMENTS

| | | | | |
|---|---|---|---|---|
| 1,504,248 | A * | 8/1924 | Johnson | 83/477.2 |
| 2,839,100 | A | 6/1958 | Valicenti | |
| 3,116,658 | A * | 1/1964 | Baker | 83/278 |
| 4,370,909 | A * | 2/1983 | Jennings | 83/436.2 |
| 4,397,598 | A * | 8/1983 | Ess et al. | 414/788 |
| 4,485,711 | A | 12/1984 | Schnell | |
| 4,603,612 | A | 8/1986 | Atkins | |
| 4,934,421 | A * | 6/1990 | Jardinico, Jr. | 144/136.9 |
| 5,018,773 | A | 5/1991 | Stavin et al. | |
| 5,678,467 | A * | 10/1997 | Aigner | 83/436.2 |
| 5,875,827 | A * | 3/1999 | Brutscher et al. | 144/253.1 |
| 6,135,521 | A | 10/2000 | Wirth, Jr. et al. | |
| 6,732,623 | B1 * | 5/2004 | Jennings | 83/436.2 |
| 7,146,890 | B1 | 12/2006 | Rowe | |
| 7,540,224 | B2 | 6/2009 | Wang | |
| 7,886,641 | B2 | 2/2011 | Wirth, Jr. et al. | |
| D665,638 | S | 8/2012 | Krohmer et al. | |
| 2005/0092152 | A1 * | 5/2005 | Wirth et al. | 83/436.2 |
| 2012/0036974 | A1 * | 2/2012 | Koegel | 83/418 |

* cited by examiner

*Primary Examiner* — Kenneth E. Peterson
*Assistant Examiner* — Samuel A Davies
(74) *Attorney, Agent, or Firm* — Robert L. Wolter; Beusse, Wolter, Sanks & Maire, PLLC

(57) ABSTRACT

A push block for a woodworking tool comprises at least heel member at an end of the push block and the heel member is passively actuatable to an extended position to engage a trailing end surface of a work piece to advance the work piece by a working element. The push block also includes a wall member along a first side of the push block to serve as a barrier between a cutting element and an operator's hand. In addition, the push block includes a handle that is disposed obliquely relative to first and second sides and a longitudinal axis of the push block.

11 Claims, 20 Drawing Sheets

PUSH BLOCK FOR A WOODWORKING APPARATUS

BACKGROUND OF THE INVENTION

This invention relates generally to the field of woodworking tools, and more particularly to the push blocks that are used to advance or push a work piece past a cutting element of a wood working apparatus to cut the work piece.

Push blocks are devices that are used by operators of woodworking tools to advance, push or force a work piece past a cutting element of the woodworking tool to cut the work piece. Such push blocks typically have a body with a generally flat surface that engages a surface of the work piece e.g., a top horizontal surface. A heel member or surface is disposed perpendicular to the bottom surface of the push block and engages a trailing end of the work piece. A handle is provided for the operator to grasp and advance the work piece push the work piece the cutting element. The cutting apparatus typically has a guide rail that a side of the work piece abuts to advance the work piece in a straight line.

Many prior art push block have a relatively narrow base or body and should be limited to use with narrower work pieces; however, when used to cut wider pieces these push blocks can be unsteady. To that end, a number of push blocks do not have any sort of barrier between the cutting element and the handle exposing the operator's hand to the cutting element. In addition, prior art push blocks do not have replaceable parts so when for example the heel is damaged the operator must replace the entire push block.

Accordingly, the below described push block provides a stable relatively wide base or main body to support the push block on a surface of the work piece and/or woodworking tool. In addition, the inventive push block provides a safety barrier between its handle and a cutting element. The inventive push block also provides readily and easily moved heel members that extend and retract as necessary in either a vertical or horizontal cutting position. Moreover, the heel members are replaceable if damaged or are otherwise required to be replaced.

BRIEF DESCRIPTION OF THE DRAWINGS

These and other advantages of the invention will become more apparent from the following description in view of the drawings. Similar structures illustrated in more than one figure are numbered consistently among the drawings.

DETAILED DESCRIPTION OF THE INVENTION

Figure 1:
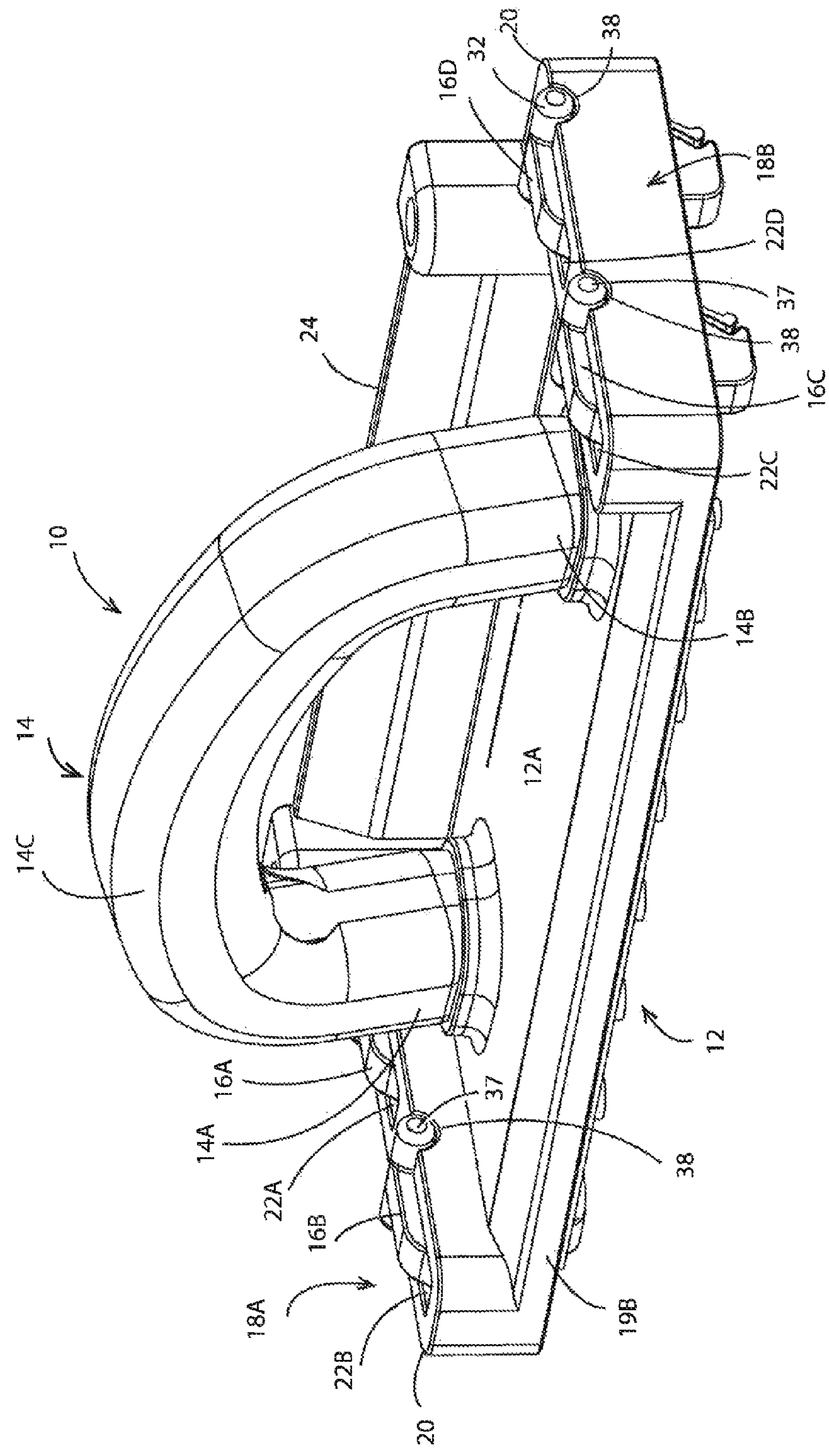
FIG. 1 is a perspective view of a second side of a push block in accordance with the present invention.
Figure 2:
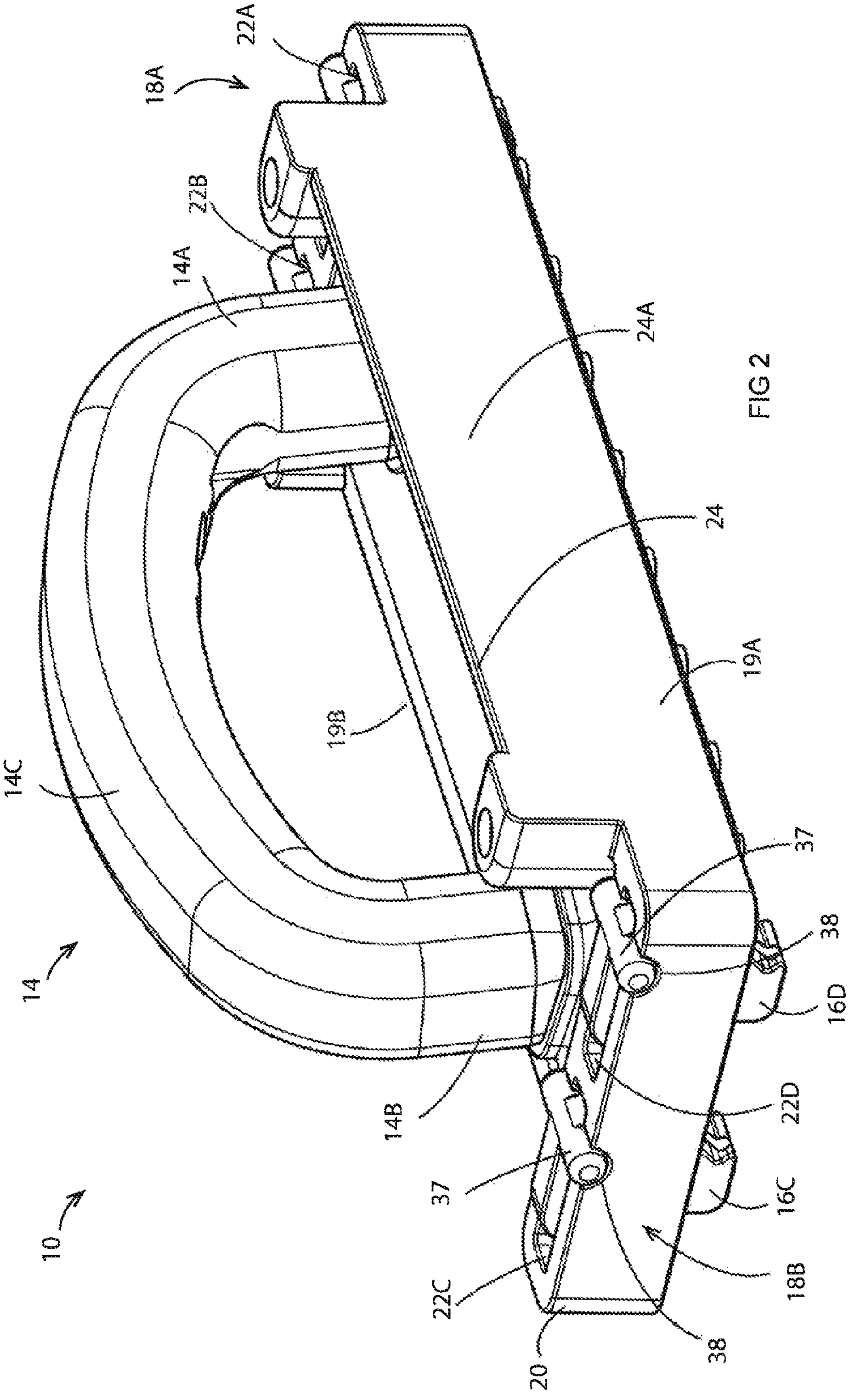
FIG. 2 is a perspective view of a first side of the inventive push block.
Figure 3:
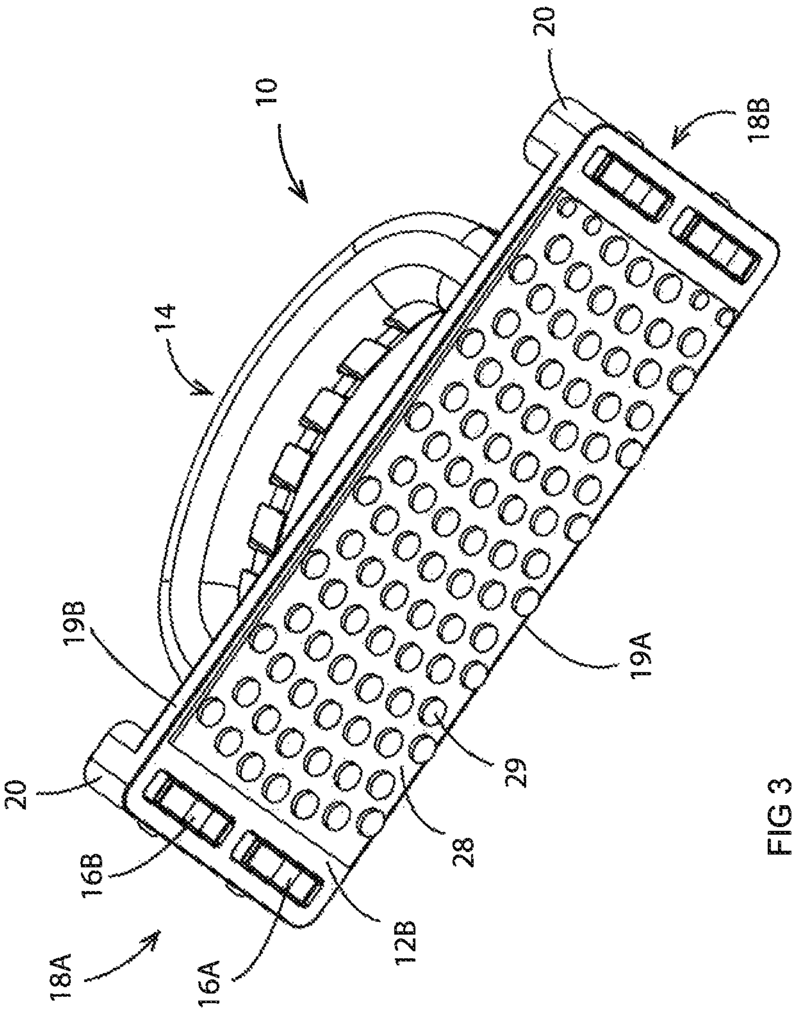
FIG. 3 is a bottom perspective view of the inventive push block with a friction pad.
Figure 4:
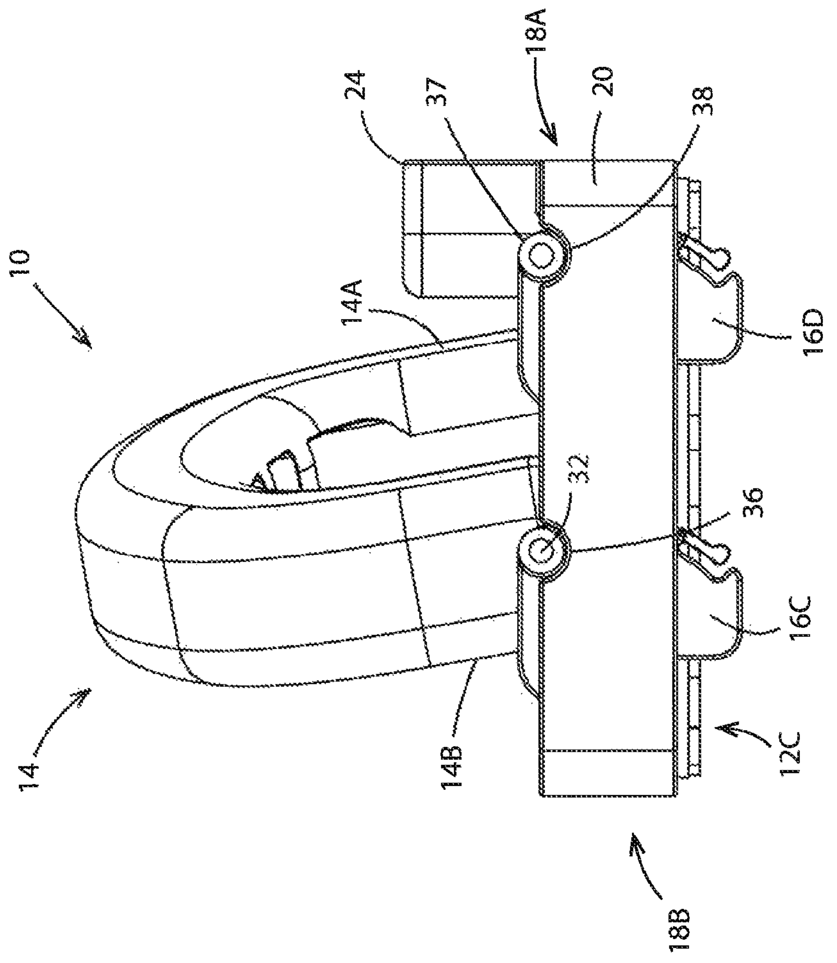
FIG. 4 is an end view of the inventive push block with the retractable heel members in an operational position.

The inventor has developed an inventive push block for use with a woodworking or cutting apparatus such as a table saw, band saw, router, jointer or the like that provides a simple design to advance a work piece passed a cutting element when the push block is disposed against the work piece in either a horizontal or vertical position. The push block of the present invention, also has safety features not previously found on prior art push blocks, and other features detailed below that provide or more efficient cutting operation.

With respect to FIGS. 1-4, an embodiment of a push block 10 in accordance with the present invention is illustrated. As shown, the push block 10 includes a main body portion 12 (or main body) that includes a top surface 12A and a bottom surface 12B. The bottom surface 12B may include a non-slip pad 28 to prevent the push block 10 slipping against a surface of the work piece, when the work piece advanced past a cutting element of a cutting apparatus. The non-slip pad 28 includes a plurality of spaced apart protrusions 29 that together at least partially form a generally flat surface of the bottom surface 12B. The protrusions 29 are formed with hardness of predetermined durometer which provides strong non-slip function and can be self-leveled individually to any imperfectly flat work surface, the spaces between protrusions 29 allow excessive wood chips or dust to escape during cutting operation.

A handle 14 is disposed on the main body portion 12 and extends upward or outward relative to the top surface 12A of the main body 12 and includes a first base 14A and a second base 14B mounted to the main body portion 12, and a grip section 14C integrally formed with and extending between the first and second bases 14A, 14B.

The main body 12 also includes a first end 18A and a second end 18B. In an embodiment, the push block 10 includes at least one passively actuated or actuatable heel member disposed at the first end 18A or second end 18B. In the embodiment illustrated and described herein, the push block 10 includes a first pair of heel members 16A, 16B at the first end 18A and a second pair of heel members 16C, 16D at the second end 18B of the main body 12. The term passively actuated as used here is intended to mean that gravity is the sole or primary force that causes the heel members 16 to pivot, actuate or move from a retracted position to an extended operational position. Other mechanisms such as biasing means or resilient material or part that facilitate the movement of a part are not required move the heel heal members of this inventive push block 10. As will be explained in more detail below, when the heel members 16A-16D move to an extended position one or more surfaces of the heel members are exposed, and disposed at an angle relative to the bottom surface 12B to engage an end or end surface on the work piece for advancement of the work piece along a cutting apparatus and past a cutting element of the cutting apparatus. In addition, the heel members 16A-16D are passively actuatable to an extended position when the push block 10 is disposed in a horizontal or vertical position when engaging a work piece.

As further illustrated, the main body 12 includes a first side 19A to face or abut a surface of a cutting apparatus, such as the surface of a guide rail, and a second side 19B opposite the first side 19A. A wall member 24, integrally formed to the main body 12, extends upward or outward relative to the first side 19A and top surface 12A of the main body 12. The wall member 24 has an outside surface 24A that is coextensive or flush with a surface of first side 19A and is preferably disposed perpendicular to the bottom surface 12A of the main body 12. The wall member 24 provides additional support to stabilize the push block 10 against a surface of the cutting apparatus to advance a work piece past a cutting element.

Figure 6:
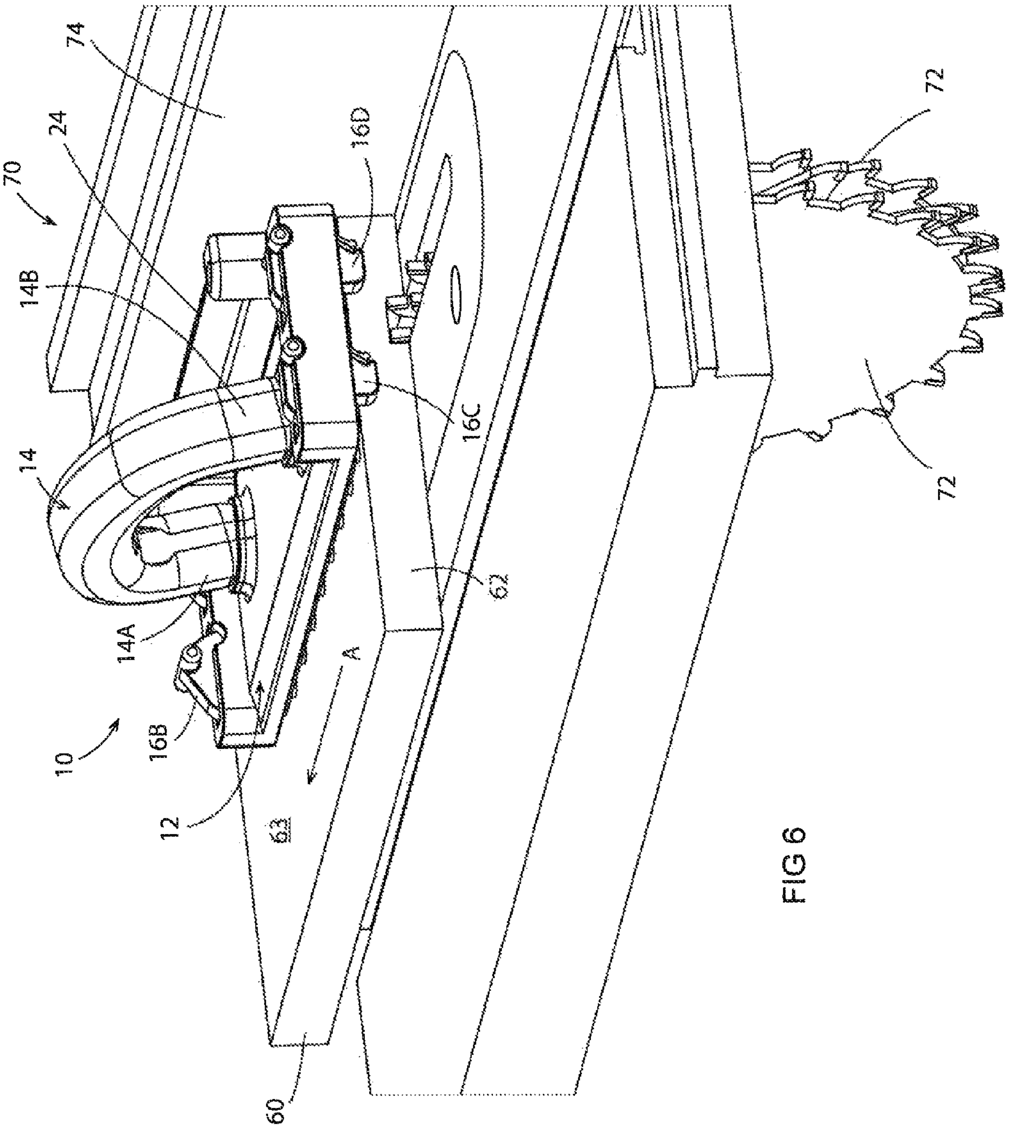
FIG. 6 is a perspective view of the inventive push block in connection with the work piece and cutting apparatus of FIG. 5.
Figure 7:
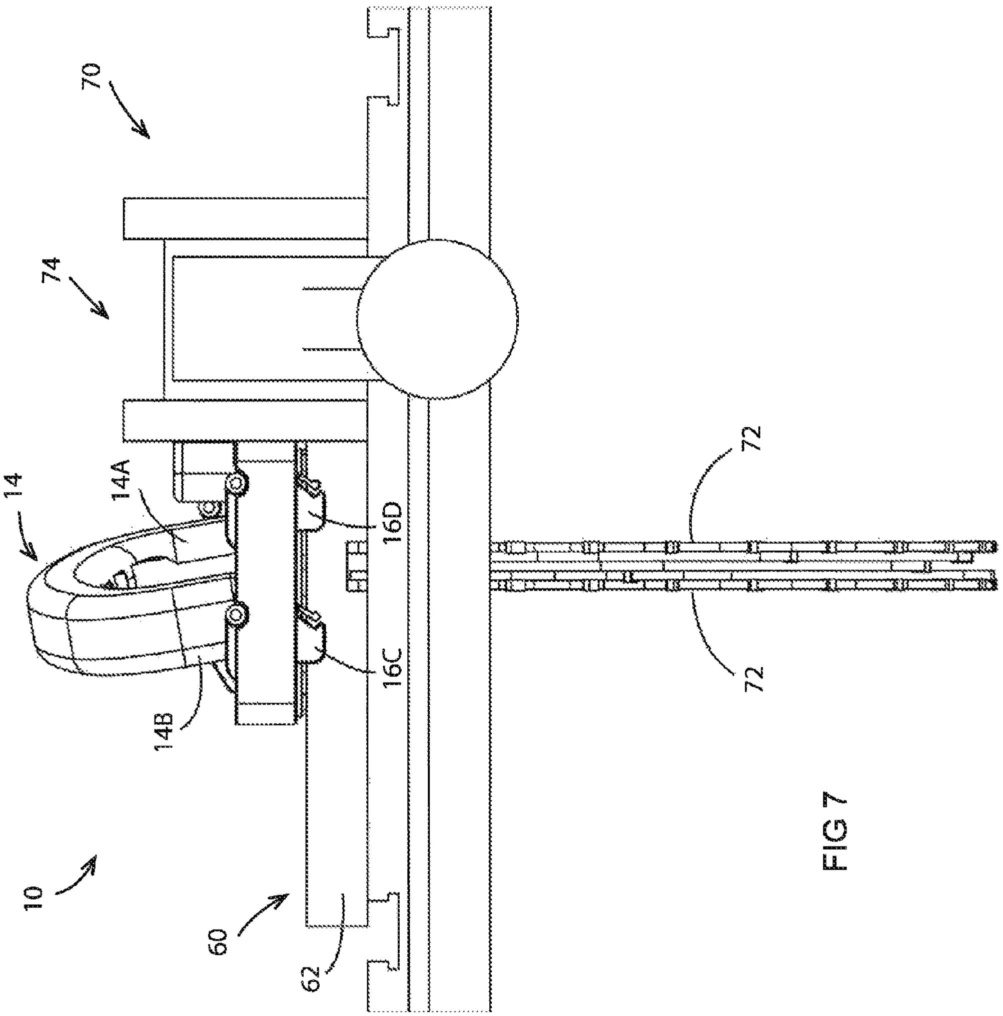
FIG. 7 is an end view of the inventive push block in connection with the work piece and cutting apparatus of FIG. 5.
Figure 8:
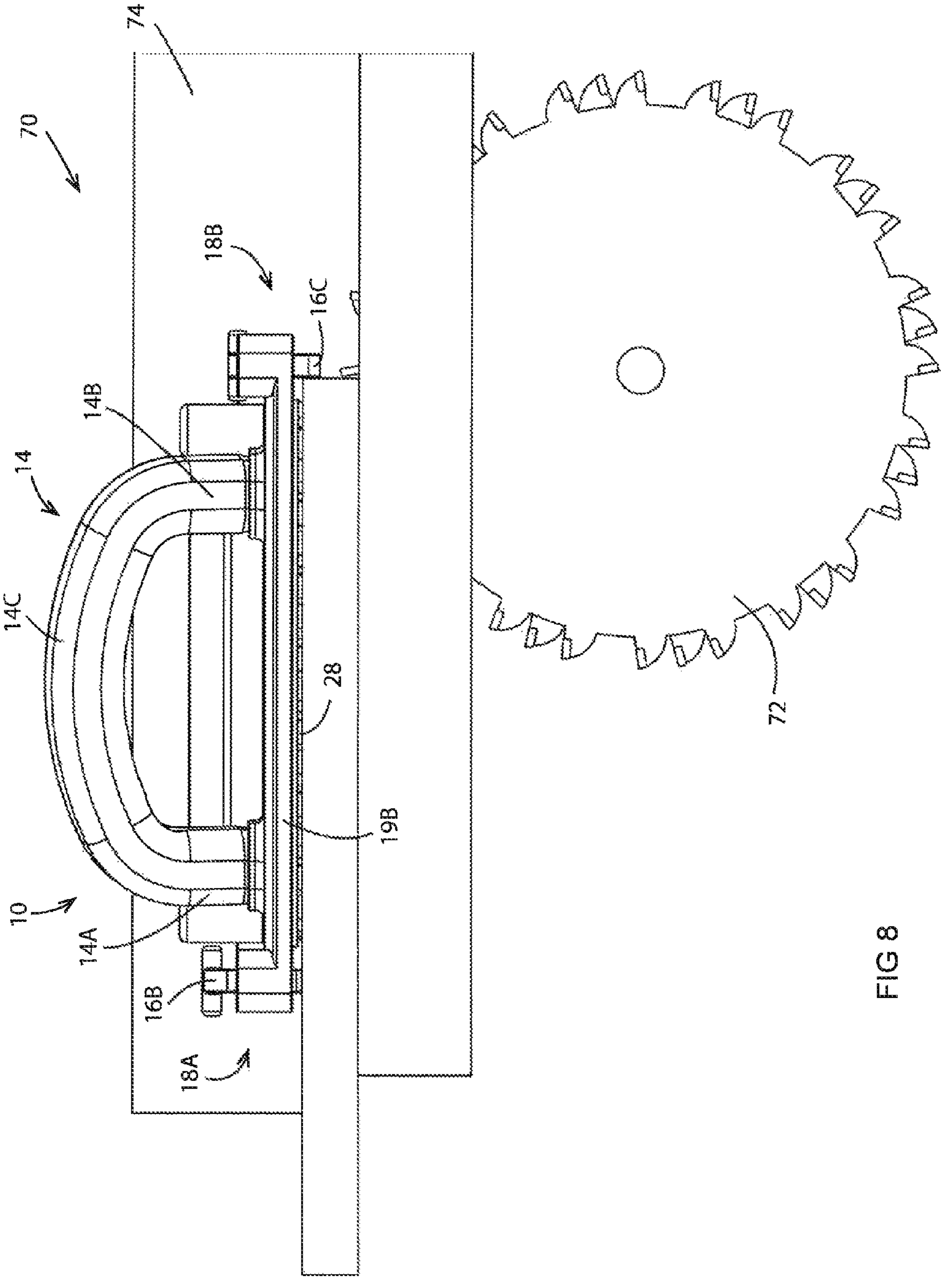
FIG. 8 is a side elevational view of the inventive push block in connection with the work piece and cutting apparatus of FIG. 5.
Figure 12A:
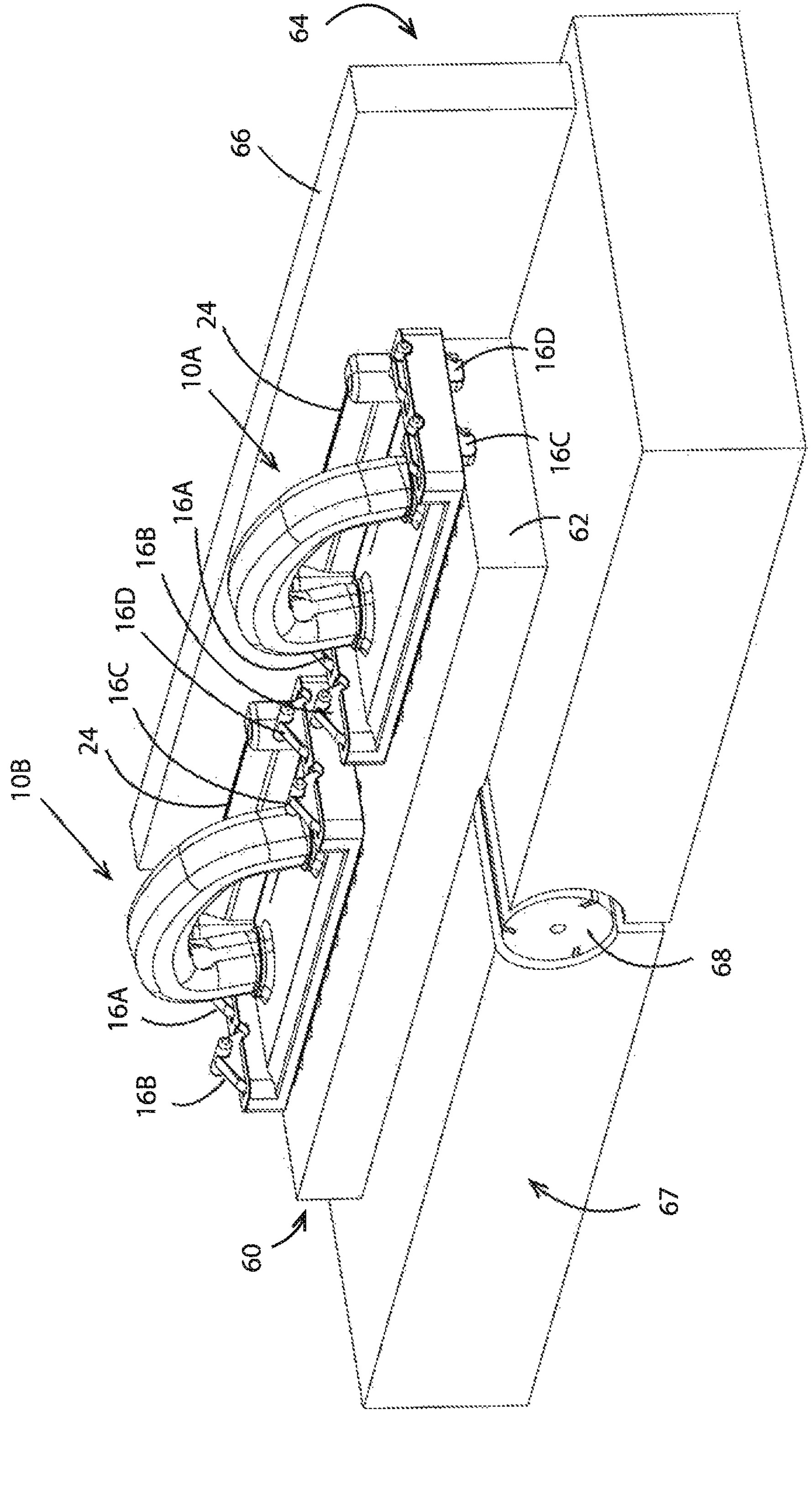
FIG. 12A is a perspective view of two of the inventive push block engaging a work piece on a jointer cutting apparatus with a table and a guide rail.
Figure 12B:
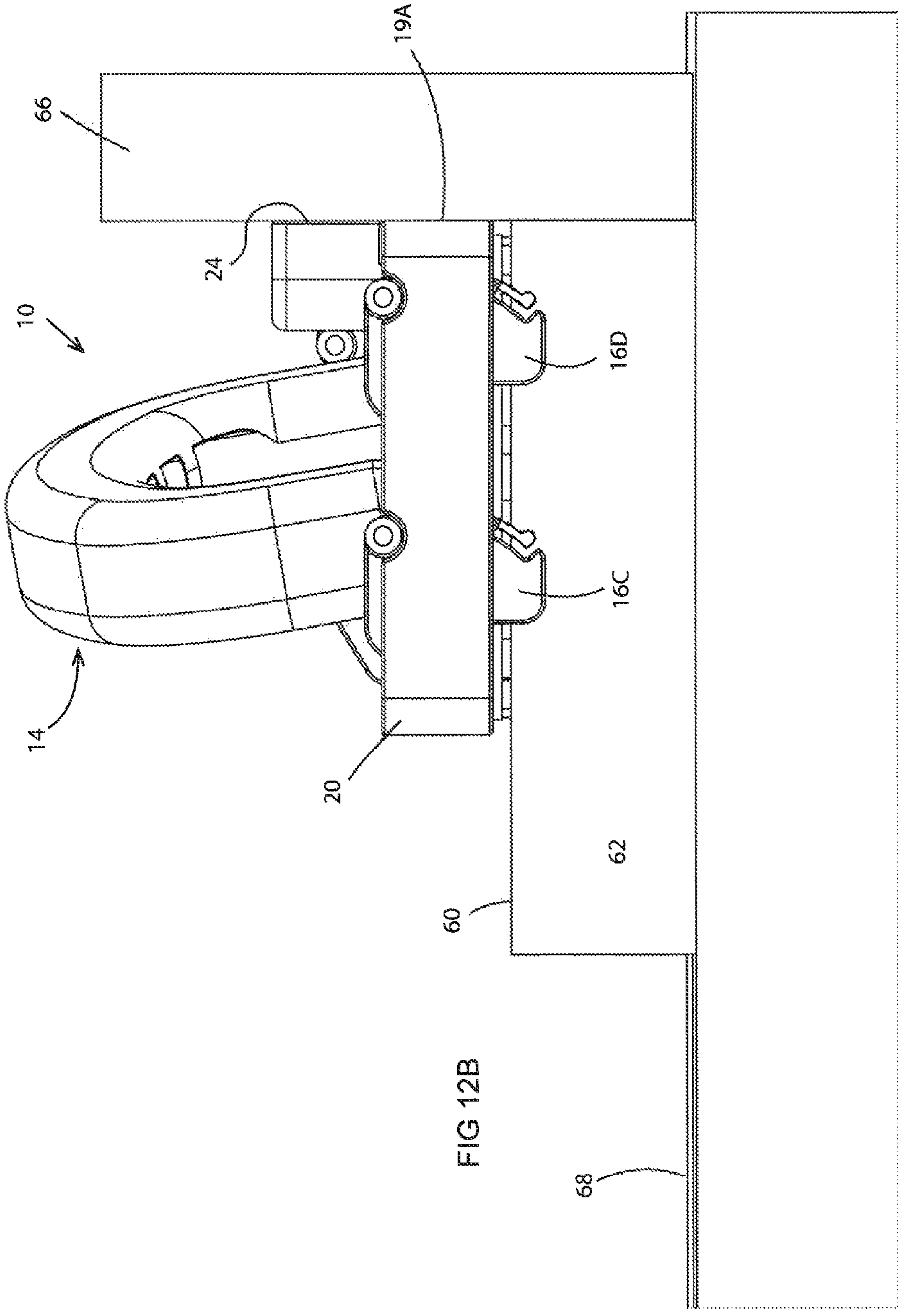
FIG. 12B is an end view of one of the inventive push blocks of FIG. 12A.

With respect to FIGS. 6-8, the push block 10 is shown in connection with a table saw 70 with a dado blade set 72 for cutting a groove in the work piece 60. As shown the wall member 24 and first side 19A abut a guide rail 74 of the table saw 70. In addition, the heel members 16C, 16D are in an extended position for engaging the trailing end surface 62 to push the work piece 60 in the direction of the arrow A. As shown in FIGS. 12A and 12B, two push blocks 10A and 10B are shown in use with a jointer cutting apparatus 64 and the wall members 24 abut a guide rail 66 to push the work piece 60 on table 67 over and past the cutting element 68. The heel members 16C and 16D of the first push block 10A engage a trailing end 62 of the work piece 60, and all the heel members 16A-16D are pivoted to the retracted position automatically when engaging the top surface 63 of the work piece 60. Similarly, the heel members 16A, 16B of the first push block 10A are in a retracted position.

Figure 13A:
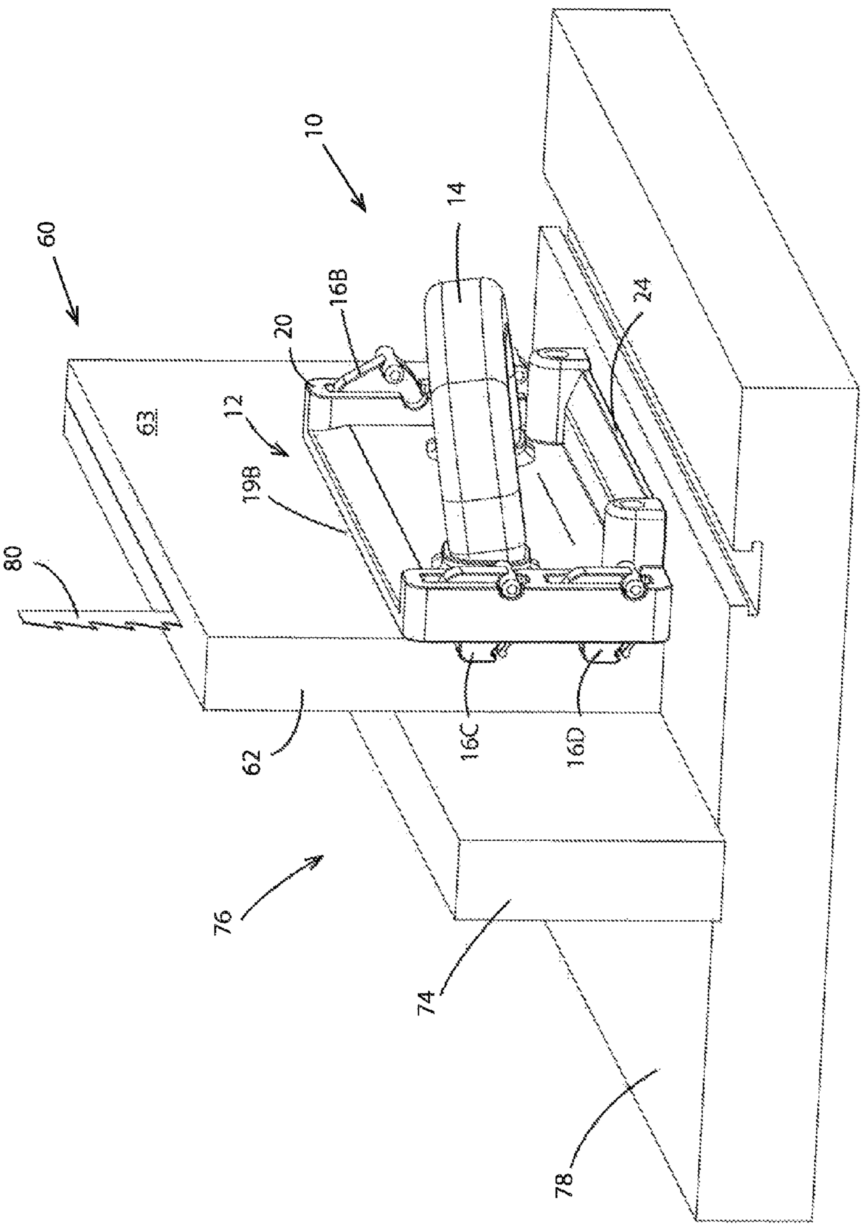
FIG. 13A is a perspective view of the inventive push block engaging a work piece on a band saw with a table and a guide rail, with the push block disposed in a vertical operating position.
Figure 13B:
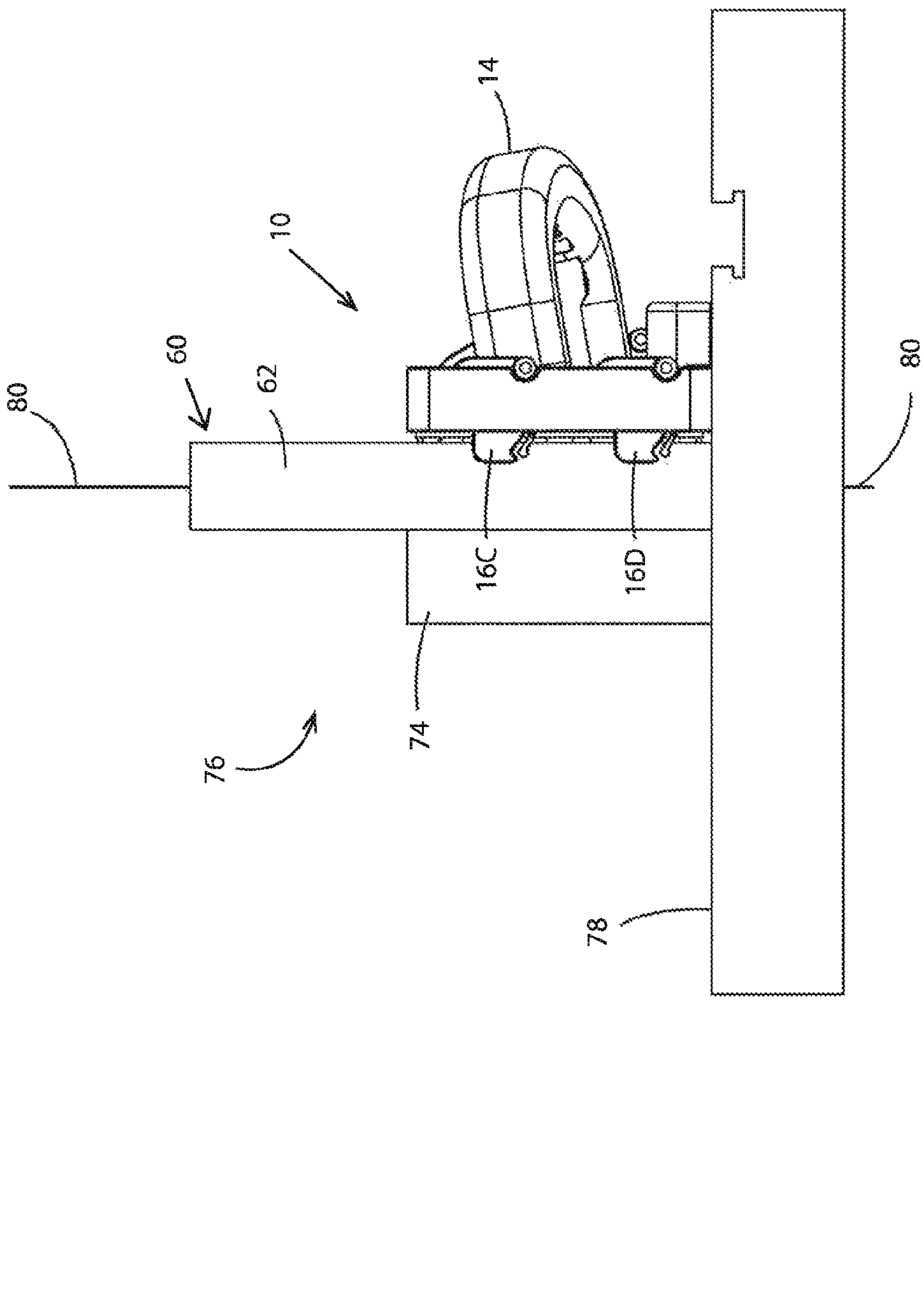
FIG. 13B is an end view of the inventive push block of FIG. 13A.
Figure 14A:
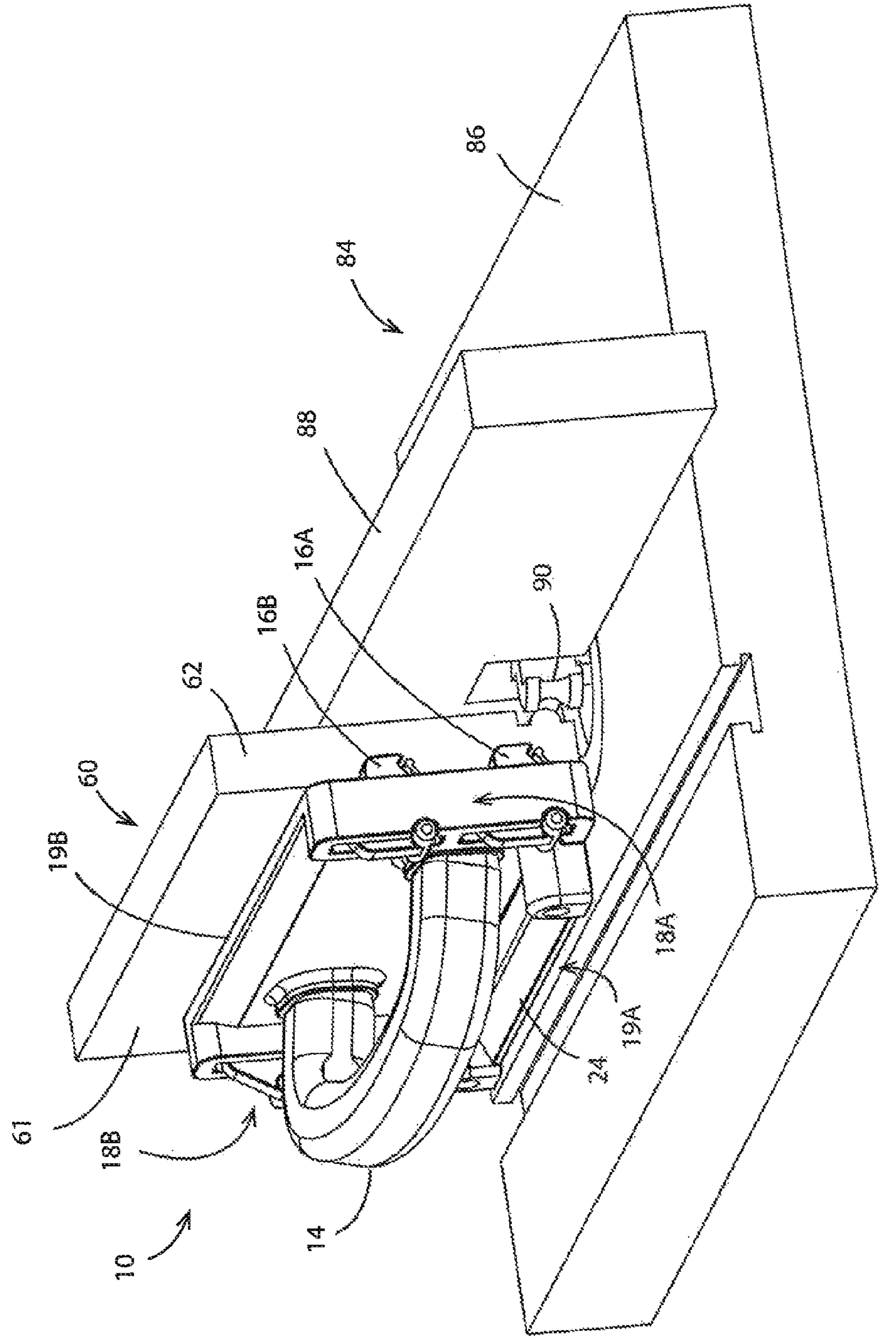
FIG. 14A is a perspective view of the inventive push block engaging a work piece on a router with a table and a guide rail, with the push block disposed in a vertical operating position.
Figure 14B:
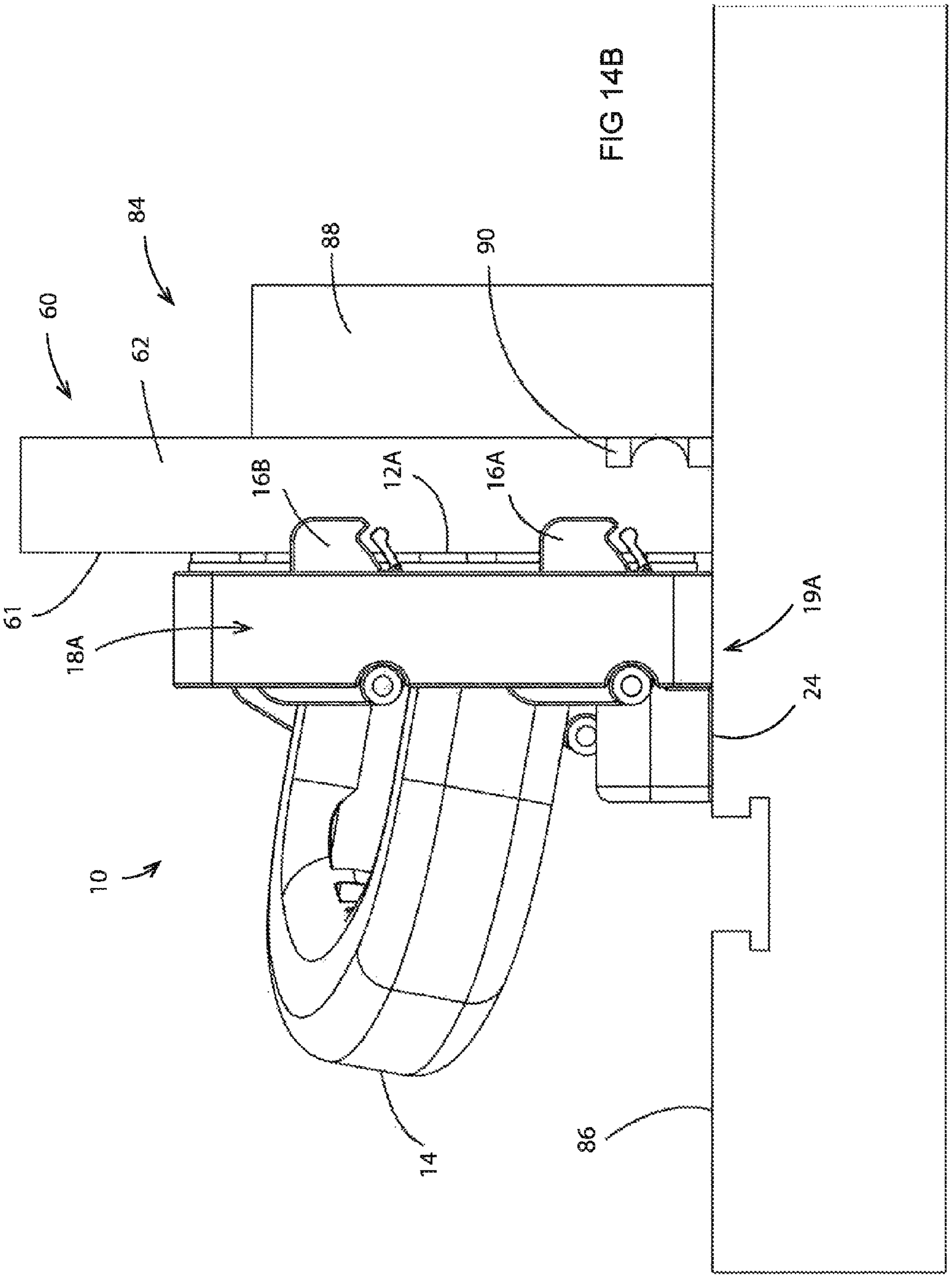
FIG. 14B is an end view of the inventive push block of FIG. 14A.

With respect to FIGS. 13A and 13B, the push block 10 is shown in use in connection with a band saw assembly 76 including a table 78, band saw 80 and guide rail 82. As shown, the push block 10 is vertically orientated so that wall member 24 abuts the table 78 of the band saw 76. In addition, despite being in a vertical position, the heel members 16C, 16D are passively actuated to an extended position to engage a trailing end or surface 62 of the work piece 60. The push block 10 is also shown in a vertical orientation in FIGS. 14A and 14B in connection with a router cutting apparatus 84 including a table 86, guide rail 88 and router bit 90. In this vertical orientation the wall member 24 and first side 19A abut the table 86 as the bottom surface 12A and heel member engages corresponding surface 63 of the work piece 60.

The wall member 24 also provides a safety feature not found in prior art push blocks. For example, with respect to FIGS. 16A and 16B, the push block 10 is shown in use with a router 92, which includes a table 98 and router bit 96. This particular router 92 does not include a guide rail; however, a bearing 94 on the bit 96 provides control of the movement of the work piece 60. As shown, the work piece 60 is advanced past the router bit 96 without the assistance of a guide rail. Accordingly, when a user grasps the handle 14 and advances the work piece 60 past the router bit 96, the raised wall member 24 is positioned between the handle 14 and the router bit 96, thereby providing a barrier between an operator's hand and the router bit 96.

Figure 5:
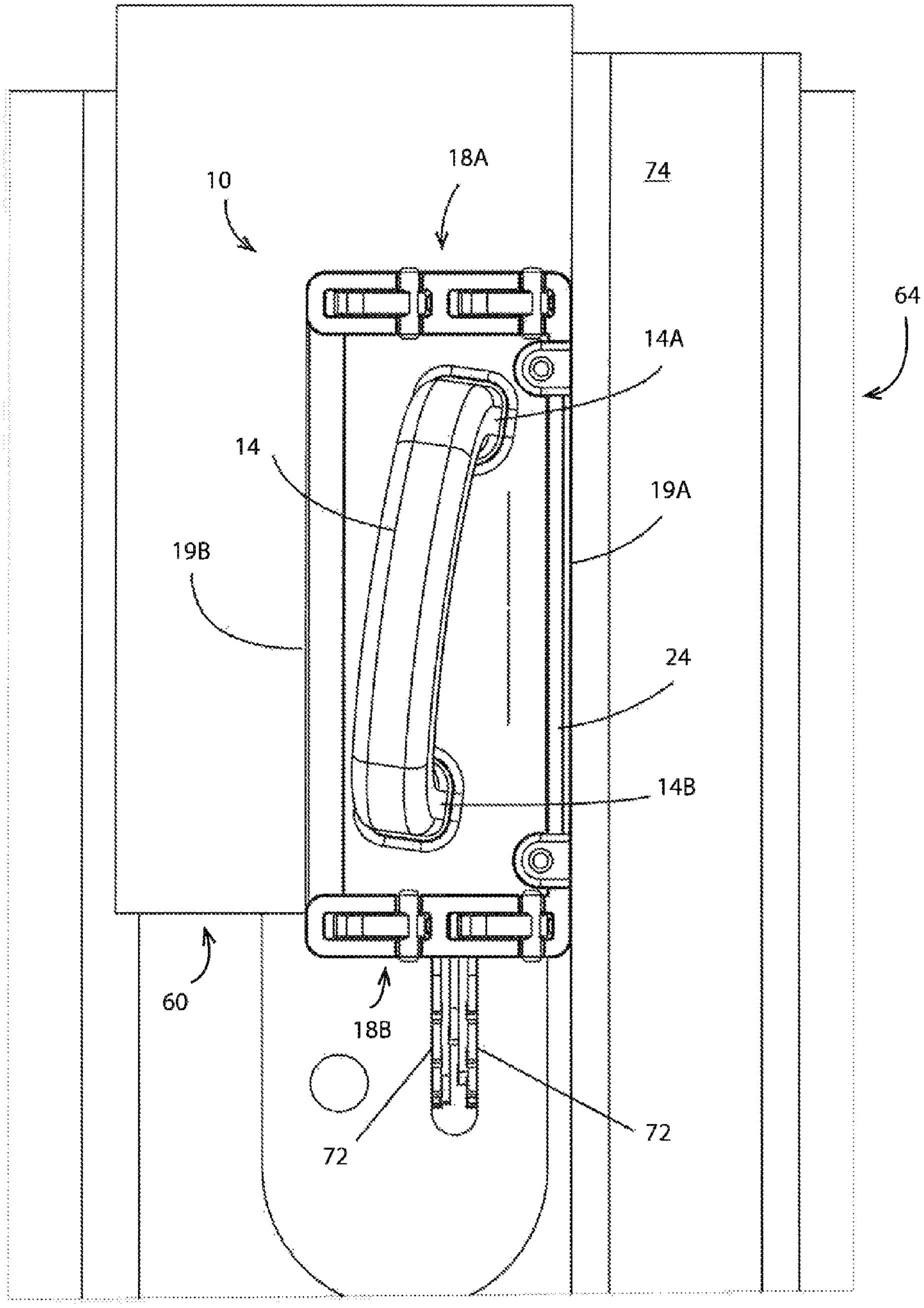
FIG. 5 is a top view of the inventive push block in connection with a work piece and table saw with dodo saw blades.

With respect to FIG. 5, the handle 14 on the push block 10 is especially configured to provide both a safety feature and provide for more efficient and stable movement of the work piece 60 on the cutting apparatus 64. As shown in FIG. 5, the handle 14 is disposed at an angle relative to the first and second sides 19A, 19B and the wall member 24 of the push block 10. More specifically, the first base 14A of the handle 14 is disposed toward the first side 19A and/or the second base 14B of the handle 14 is disposed toward the second side 19B. That is, the handle 14 is disposed in a skewed position on the push block 10 or is disposed obliquely relatively to the first and second sides 19A, 19B and wall member 24. This particular feature of the handle 14 can also been seen in FIGS. 6, 7, 9 and 12B.

As may be appreciated in FIG. 5, when an operator grasps the handle 14 the oblique disposition of the handle 14 tends to direct the force applied by an operator against the guide rail 74. This directional force applied by an operator tends to maintain the work piece 60 in abutting relationship against the guide rail 74 during cutting, which will provide for a straighter cut.

Figure 16A:
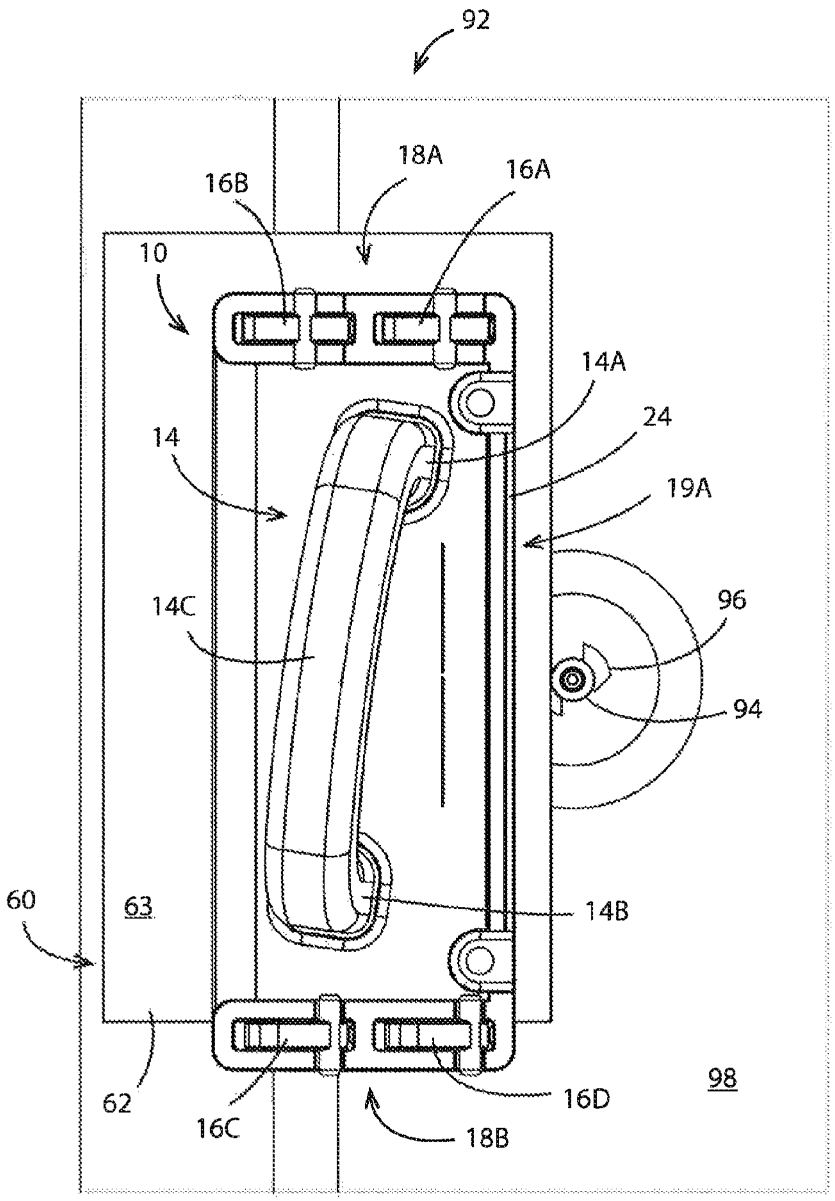
FIG. 16A is a top view of the inventive push block engaging a work piece on router cutting apparatus.
Figure 16B:
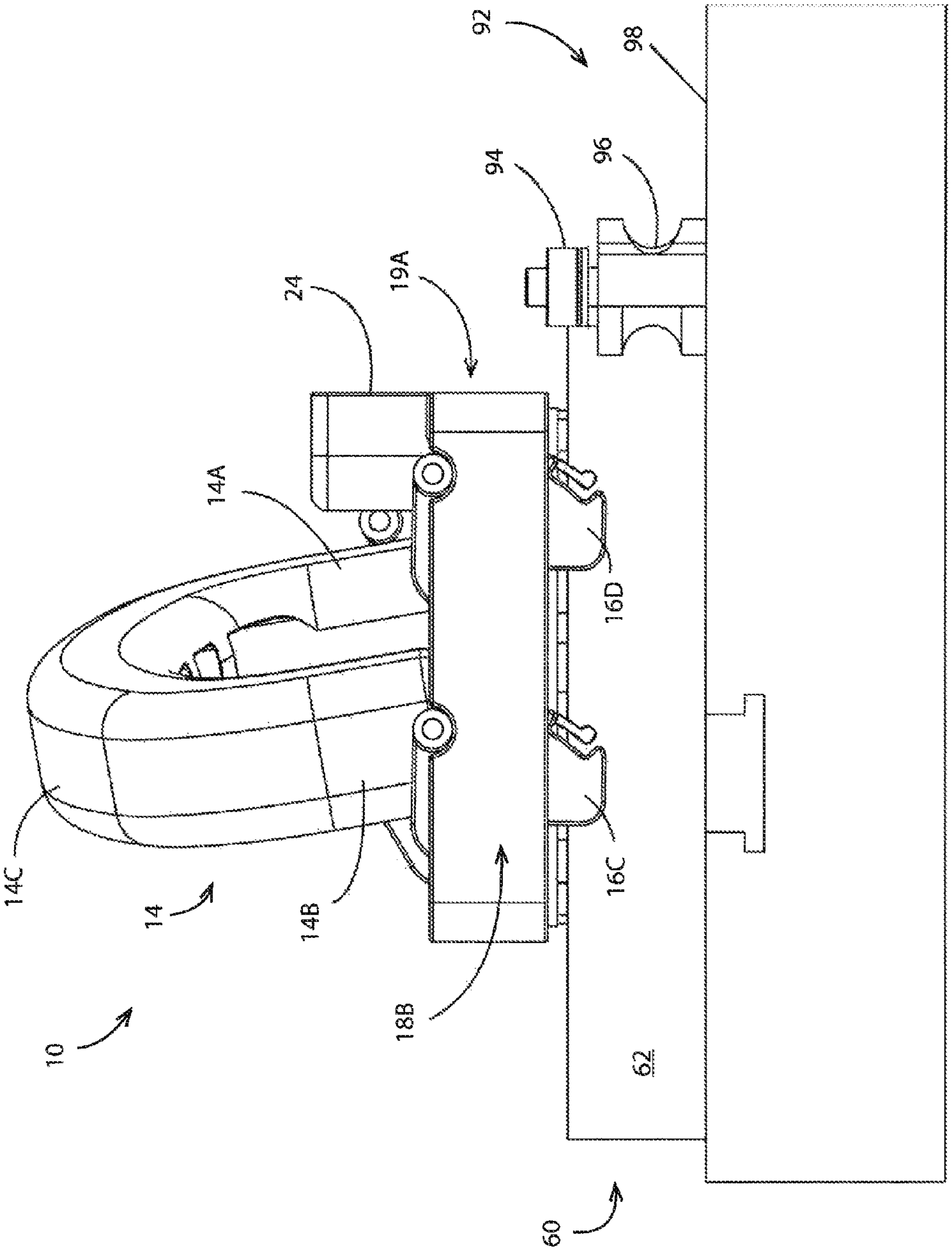
FIG. 16B is an end view of the inventive push block engaging a work piece on router cutting apparatus.

In reference to FIGS. 16A and 16B, the safety feature of the handle may be appreciated with respect to the use of the push block 10 in connection with a router 92, which includes a table 98 and router bit 96. More specifically, the hand or portions of an operator's hand will be spaced further away from the router bit 96 to avoid the router bit 96 while advancing the work piece 60 past the bit 96. As may be appreciated in FIGS. 6 and 7, the handle 14 is tilted away from the first side 19A, which is a safety feature found in a number of prior art push blocks; however, the inventor of the subject inventive push block 10 is not aware of prior art devices that include an obliquely disposed handle.

The passively actuated heel members 16A-16D are now described in more detail in referenced to FIGS. 1, 2 and 9-11. With respect to FIGS. 1, and 4, the push block 10 is illustrated as including two pairs of passively actuated heel members including the four heel members 16A-D, with each pair disposed at a respective ends 18A, 18B of the push block 10. While, the embodiments described herein include four heel members, the invention may include fewer or more heel members at one or both ends of the push block 10, depending at least in part on the size of the push block. For example, the push block 10 may include only a single passively actuated heel member disposed at one end 18A or 18B of the push block. Moreover, movement of the heel member is not limited to the pivoting action described below, for example the heel member may be configured to move up and down between retracted and extended positions.

Raised bosses 20 are disposed at each end 18A, 18B, and each boss 20 includes a pair of slots in which a corresponding heel member 16A-16D is pivotally mounted. More specifically, heel members 16A, 16B are pivotally mounted in slots 22A, 22B formed in the boss 20 at the first end 18A; and, heel members 16C, 16D are pivotally mounted in slots 22C, 22D are formed in the boss 20 at the second end 18B. Providing passively actuated heel members at each end 18A, 18B allows operation of the push block 10 in any direction along a cutting apparatus, regardless of the position of a cutting element or guide rail of a cutting apparatus.

Figure 9:
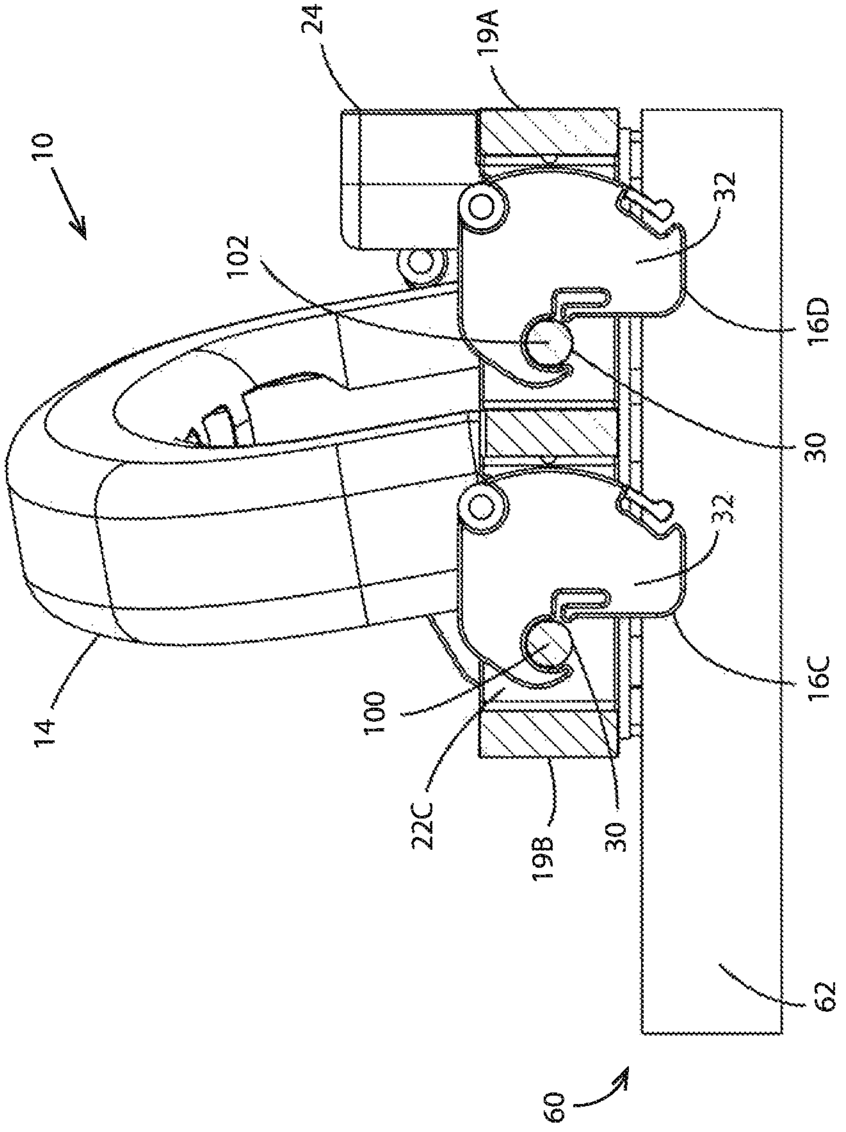
FIG. 9 is an end sectional view of the inventive push block on a work piece with the heel members in an operational position engaging a trailing end of the work piece.
Figure 10:
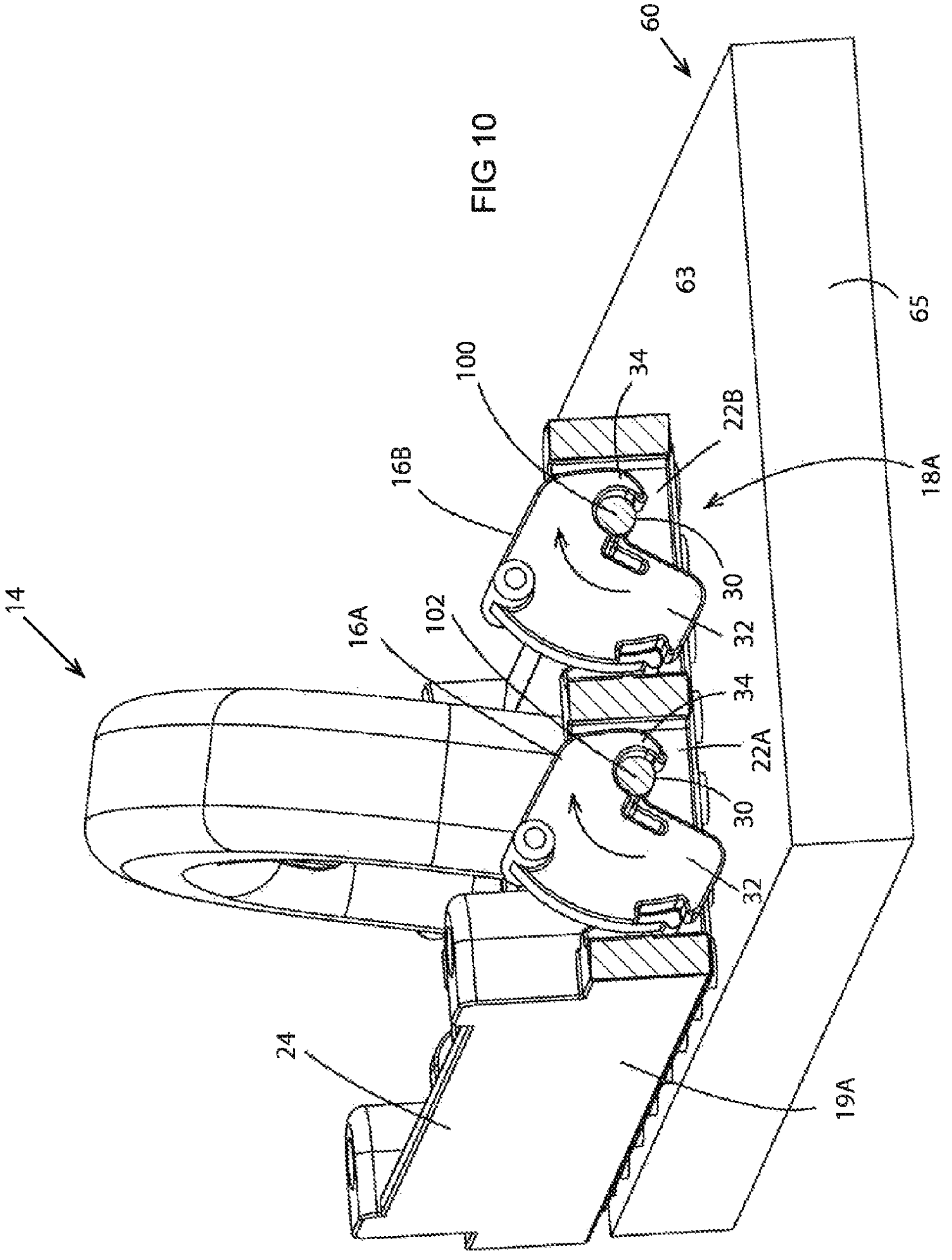
FIG. 10 is a perspective sectional view of the opposite end of the push block of FIG. 9 and showing the leading end of the work piece.

In reference to FIGS. 9 and 10, the opposite ends 18A, 18B of the same push block 10 are shown with the heel members 16C, 16D of FIG. 9 in an extended position, and the heel members 16A, 16B of FIG. 10 shown in a retracted position. In reference to FIG. 9, an end view of the push block 10 on a work piece 60 includes a sectional view of the second end 18B of the push block with heel members 16C, 16D pivoted to respective extended positions engaging a trailing end 62 of the work piece 60. To that end, the bottom surface 12A, including the non-slip pad 28, engages a top surface 63 of the work piece 60. Accordingly, as shown FIG. 10, when the first end of push block 10 is positioned on the top surface 63 of work piece 60 the heel members 16A, 16B pivot upward resting against top surface 63 of the work piece 60 and facing the leading end 65 of the work piece 60. In this manner, the heel members 16A, 16B are retracted or stored to not interfere with a cutting operation. In instances in which the work piece 60 is relatively thin and short whereby an end 18A, 18B of the push block 10 extends over a trailing edge of the work piece 60, the heel members 16A, 16B can be locked in a stored position, as will be explained below in more detail.

Each respective heel member 16A-16D pivots about a pivot axis 100, 102 each of which is generally laterally offset relative to a center of a heel body 32. More specifically, a pin 30 is fixed within each respective slot 22A-D and the heel body 32 is operatively connected to the pin 30 to pivot about a respective pivot axis 100, 102 each of which is parallel to a longitudinal axis of the push block 10. Heel members 16B, 16C pivot about axis 100; and, heel members 16A, 16D pivot about axis 102. A hook 34, as seen in FIGS. 9, 11, 15A, 15B is loosely fitted over the pin 30 to facilitate the passive pivoting movement of the heel body 32 of each heel member 16A-16D. This configuration of the offset pin 30 and hook 34 allows for gravity serve as the sole or primary force to cause the heel members 16A-16D to pivot from the retracted position to the extended position. In addition, the heel members 16A-16D readily retract when abutting a surface of the work piece 60.

Figures 11, 11A:
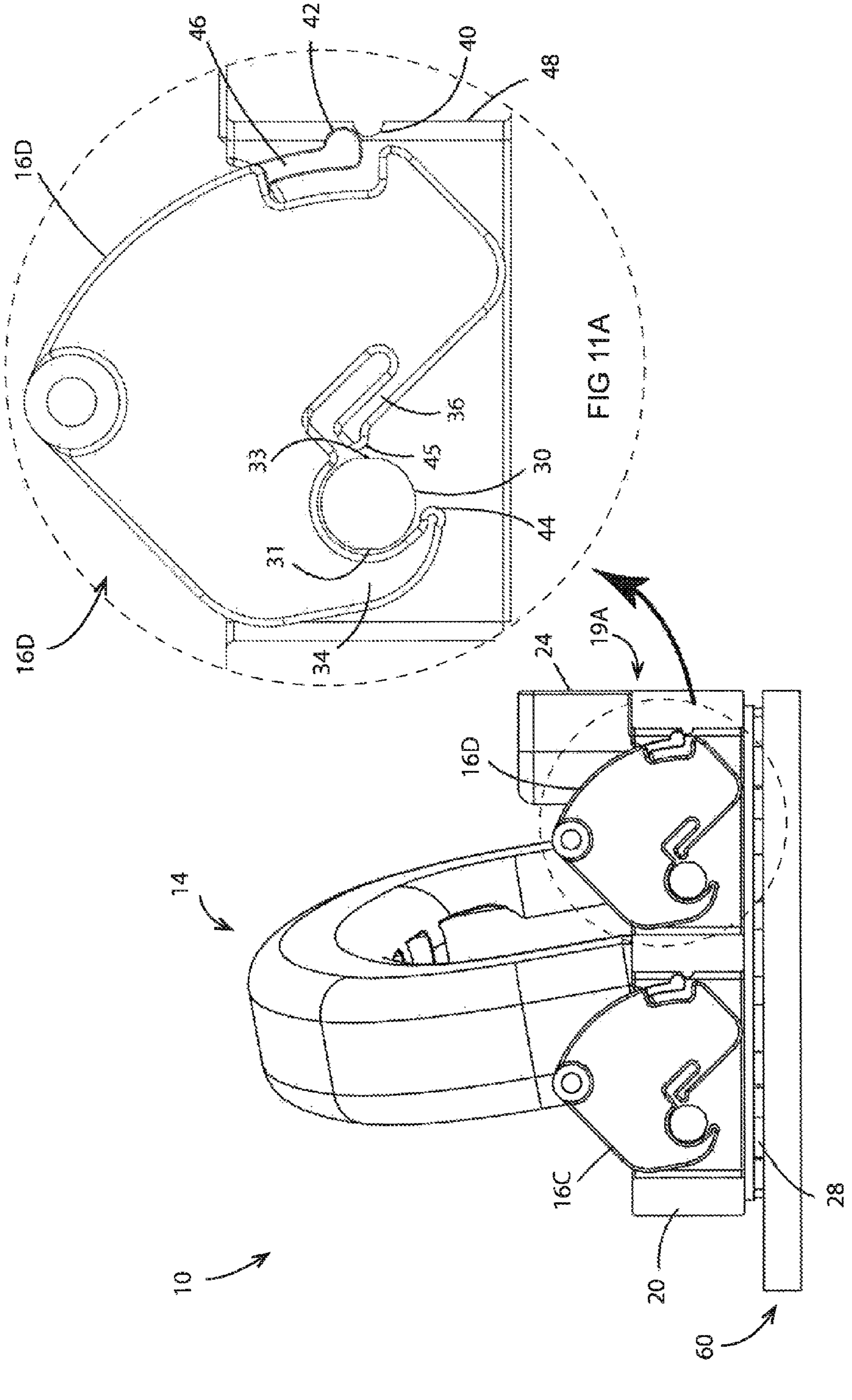
FIG. 11 is a sectional end view of the inventive push block on a work piece with the heel members in a locked position.
FIG. 11A is an inset view of one of a heel member shown in FIG. 11.

Each heel member 16A-16D and slots 22A-D includes a series of contact surfaces that secure or lock the heel members 16A-16D in the slots 22A-D. Heel member 16D shown in FIG. 11A is illustrated to provide a sample heel member to describe these contact surfaces. As shown the hook 34 has a generally elongated bulbous end 44 spaced apart from a lip 45 on a resilient arm 36. The gap distance between the hook end 44 and lip 45 is smaller than an outside diameter of the pin 30; therefore, the heel member 16D, while freely moveable for pivoting relative to the pin 30 will not fall out of the slot 22D. Also with respect to FIGS. 1 and 2, each heel member 16A-16D includes laterally extending projections 37 attached to the heel body that are disposed parallel to the longitudinal axis of the push block 10. These projections 37 may sit in recesses 38 to support or hold the heel members 16A-16D in the extended operational position.

The heel member 16D in FIG. 11A is shown in a locked position. As illustrated, a first lip 40 protrudes from slot wall 48 and a second lip 42 protrudes from the resilient arm 46. When the heel member 16D is pivoted into and partially through the slot 22D, the arm 46 gives slightly so the second lip 42 can pass over the first lip 40 locking the heel member 16D in place as shown. As explained above, it may be necessary to lock a heel member 16A-16D in position during a cutting operation when one of the ends 18A, 18B hangs over a leading end of a relatively thin work piece so the heel member does not interfere with the cutting operation. When all of the heel members 16A-16D are in the locked position, the non-slip surface 28 will take over the control of work piece entirely. One may also lock the heel members 16A-16D in position when the push block is not in use.

Figure 15B:
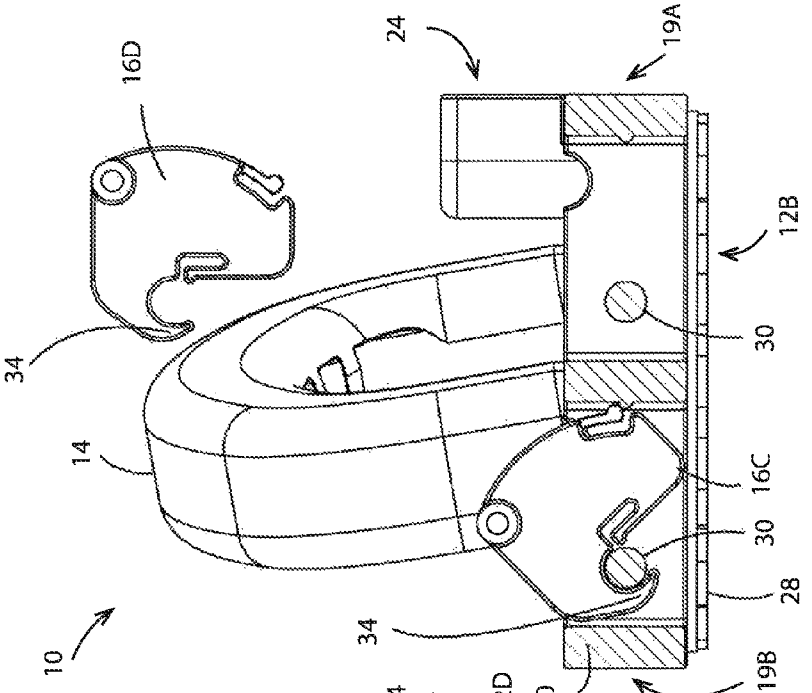
FIG. 15B is a sectional end view of the inventive push block with one heel member in a locked position and the other having been removed.
Figure 15A:
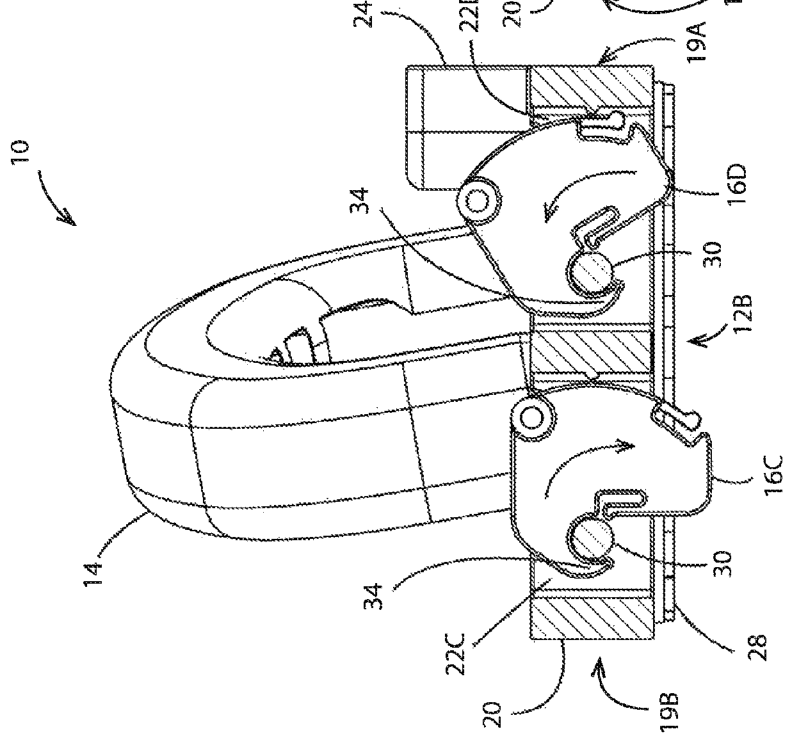
FIG. 15A is a sectional end view of the inventive push block with one heel member in an operational extended position and the other in a retracted position.

Note, the heel member 16D, as well as the others 16A-16C, are removable. More specifically, the pin 30 has generally planar sides 31, 33 and in order to remove the part 16D, the hook end 44 and lip 45 are generally aligned with the surfaces 31, 33. That is, the heel member 16D is pivoted downward to its extended position. As the heel member 16D is forced or pushed out of the slot 22D the hook end 44 and lip 45 will engage the surfaces 31, 33, defining a smaller cross section of the pin 30 and the arm 36 gives slightly so the heel member 16D can be removed as shown in FIG. 15B. Removing these parts may be necessary for example if they are damaged and providing readily replaceable parts allows the push block 10 to be continuously used.

While the preferred embodiments of the present invention have been shown and described herein, it will be obvious that such embodiments are provided by way of example only. Numerous variations, changes and substitutions will occur to those of skill in the art without departing from the invention herein. Non-limiting examples include a component that is described above as being attached to one part of the apparatus may alternatively be attached to a different part of the apparatus in other embodiments. Parts described as being indirectly connected may be connected directly to each other, and vice versa. Component parts may be assembled from individual pieces or may be integrally formed as a single unit. Alternative types of connectors and alternative materials may be used. The apparatus may be used with other types of power tools. Accordingly, it is intended that the invention be limited only by the spirit and scope of the appended claims.

The invention claimed is:

1. A push block for advancing a work piece on a cutting apparatus, comprising:

a main body portion having a generally flat bottom surface for engaging a surface of a work piece, a top surface, a first end and a second end;

a handle extending outward from the top surface of the main body portion;

wherein the main body portion further comprises a first side to face a cutting element or a surface of the cutting apparatus, when the work piece is advanced for cutting, and a second side that is opposite to the first side;

the handle has a first base fixed to the main body portion and a second base, spaced part from the first base, fixed to the main body portion, and the first base is disposed toward the first side of the main body portion and the second base is disposed toward the second side of the main body portion, and the handle has a longitudinal axis that is oblique relative to a longitudinal axis of the push block;

at least one passively actuatable heel member attached to the push block at the first end or second end of the main body portion, and the at least one heel member is actuated between an extended position and a retracted position, and in the extended position the heel member has a surface for engaging a trailing end surface of the work piece and is disposed at an angle relative to the bottom surface of the main body portion;

a raised boss at the first end or second end and at least one slot in the raised boss and the at least one heel member is disposed within the slot; and a locking mechanism for the at least one heel member wherein the locking mechanism comprises a first lip on a surface of the slot and a second lip on the help member that engages the first lip when the heel member is pivoted to a retracted position.

2. The push block of claim 1 wherein the at least one heel member pivots about a pivot axis that is parallel to the longitudinal axis of the push block from the first end to the second end of the push block, and remains in the extended position when the bottom surface of the main body portion is horizontally disposed against a surface of a work piece, when the bottom surface is vertically disposed against a surface of a work piece or disposed at angles there between.

3. The push block of claim 2 wherein the pivot axis of the at least one heel member is laterally offset relative to a center of the heel member.

4. The push block of claim 2 wherein the at least one heel member includes a first pair of heel members that are disposed at the first or second end of the main body portion and the first heel members are aligned side by side and spaced apart, wherein each respective heel member has a surface exposed for engaging the same trailing surface of the work piece when extended, and the exposed surfaces extend generally in the same plane and are disposed at an angle relative to the bottom surface of the main body portion.

5. The push block of claim 4 further comprising a raised boss at the first or second end of the main body portion and the raised boss includes a pair of slots in the raised boss and each first heel member is disposed within a respective slot.

6. The push block of claim 4 further comprising a plurality of locking mechanisms and each locking mechanism is associated with a heel member and each locking mechanism includes a first lip on a surface of a respective slot and a second lip on the respective heel member that engages the first lip when heel member is pivoted to a retracted position.

7. The push block of claim 4 wherein the at least one heel member includes a second pair of heel members that are disposed at the first or second end of the main body portion and the second heel members are aligned side by side and spaced apart, wherein each respective second heel member has a surface exposed for engaging the same trailing end surface of the work piece when extended, and the exposed surfaces extend generally in the same plane and are disposed at an angle relative to the bottom surface of the main body portion.

8. The push block of claim 7 comprising a first raised boss at the first end and a pair of first slots in the first raised boss and each first heel member is disposed within a respective first slot, and a second raised boss at the second end and a pair of slots in the second raised boss and each second heel member is disposed within a respective second slot.

9. The push block of claim 1 wherein the main body further comprises a wall member extending from the first side of the main body portion outward relative to the top surface of the main body portion.

10. The push block of claim 9 wherein the first side of the main body portion has a surface to abut a surface or face, a surface of the cutting apparatus and the wall member has a surface that is coextensive with the surface of the wall member.

11. A push block for advancing a work piece on a cutting apparatus, comprising:

a main body portion having a generally flat bottom surface for engaging a surface of a work piece, a top surface, a first end and a second end; and a handle extending outward from the top surface of the main body portion;

wherein the main body portion further comprises a first side to face a cutting element or a surface of the cutting apparatus, when the work piece is advanced for cutting, and a second side that is opposite to the first side; and the handle includes a first base disposed toward the first side of the main body portion and the first base is closer to the first side than the second side of the main body portion, and a second base disposed toward the second side of the main body portion and the second base is closer to the second side than the first side of the main body portion;

at least one passively actuatable heel member attached to the push block at the first end or second end of the main body portion, and the at least one heel member is actuated between an extended position and a retracted position, and in the extended position the heel member has a surface for engaging a trailing end surface of the work piece and is disposed at an angle relative to the bottom surface of the main body portion;

a raised boss at the first end of second end and at least one slot in the raised boss and the at least one heel member is disposed within the slot; and a locking mechanism for the at least one heel member wherein the locking mechanism comprises a first lip on a surface of the slot and a second lip on the help member that engages the first lip when the heel member is pivoted to a retracted position.

* * * * *